United States Patent [19]

Head et al.

[11] 4,071,903

[45] Jan. 31, 1978

[54] AUTOCORRELATION FUNCTION FACTOR GENERATING METHOD AND CIRCUITRY THEREFOR

[75] Inventors: Stanley Maurice Head; Constantine Michael Melas, both of Los Gatos, Calif.

[73] Assignee: International Business Machines Corporation, Armonk, N.Y.

[21] Appl. No.: 711,760

[22] Filed: Aug. 4, 1976

[51] Int. Cl.² .............................................. G06F 15/34
[52] U.S. Cl. ................................ 364/728; 179/1 SB; 364/604
[58] Field of Search ......................... 235/181, 150.53; 179/1 SA, 1 SB, 1 SC, 1 SD; 325/38 B; 364/728

[56] References Cited

U.S. PATENT DOCUMENTS

| 3,249,911 | 5/1966 | Gustafsson | 235/181 |
| 3,660,647 | 2/1972 | Pryor | 235/181 |
| 3,694,643 | 9/1972 | Smith | 235/181 |
| 3,701,894 | 10/1972 | Low et al. | 235/181 |
| 3,777,133 | 12/1973 | Beck et al. | 235/181 |
| 3,792,245 | 2/1974 | Hocker et al. | 235/150.53 |
| 3,925,650 | 12/1975 | Brown | 235/150.53 |

FOREIGN PATENT DOCUMENTS

| 563,039 | 6/1975 | Switzerland | 235/181 |
| 1,432,588 | 4/1976 | United Kingdom | 235/181 |

OTHER PUBLICATIONS

Rosenbloom: Using Time–Compression Techniques in Digital Correlation, Electronics vol. 34–1961, p. 191/193, Mar. 10, 1961.

Stone et al.: Digital Correlator Detects Voice Fundamental, Electronics Nov. 22, 1963, p. 28/30.

Gatland et al.: A Correlation Function Computer Using Delta Modulation Techniques, J. of Scientific Instr., 1965, vol. 42, p. 529/532.

*Primary Examiner*—Felix D. Gruber
*Attorney, Agent, or Firm*—George E. Roush

[57] ABSTRACT

For a delta modulated signal wave comprising a digital carrier wave modulated by an analog wave and represented accordingly as a bivalued digital data bit stream, a correlation function factor is generated by delaying the bit stream in time by an integral multiple of bits and accumulating the successive individual products over a predetermined number of bits of successive individual bits delayed in time and the corresponding currently appearing bits. The circuitry is extremely simple; readily procurable components only are required. A dual input exclusive OR (XOR) gating circuit is connected to the source of delta modulated signal bit stream and to an N-bit digital binary shift register also connected to the source. A stream of successive bivalued products of the current bits and the time delayed bits over a period of N-bits is obtained from the XOR gating circuit and applied to a bidirectional digital counting circuit from which an autocorrelation function factor is delivered.

6 Claims, 7 Drawing Figures

AUTOCORRELATION FUNCTION FACTOR GENERATING METHOD AND CIRCUITRY THEREFOR

The invention relates to methods and circuitry for generating autocorrelation function factors for electric wave modulation systems, and it particularly pertains to such for delta modulation systems and the like where the resulting electric wave is a data stream of (bivalued) bits.

The autocorrelation function (ACF) has found wide usage recently in generating high quality speech with few bits (predictive encoding) and in analyzing speech for word recognition or verification.

The classical method used by everyone in the field to date for generating ACF for digital analysis is to sample the waveform and quantize each sample in a binary byte (PCM). The $n^{th}$ autocorrelation function is defined as:

$$A(n) = \sum_{i=0}^{i=n} yi \cdot (yi + n) \quad (1)$$

Each sample $Yi$ is multiplied by a sample $n$ samples away $Yi+n$, then the products are summed to calculate the ACF as defined by the equation (1).

In the predictive encoding of speech, about 12 ACF must be computed simultaneously which involves a large number of multiplications. For real time operation, this requires either the use of a relatively fast computer, or of a special purpose hardware multiplier attached to a slower computer.

An example of prior art development is found in the Journal of the Acoustical Society of America, Vol. 50, Number 2 (Part 2), 197 at pages 637–655. This article by B. S. Atal and S. L. Hanauer entitled "Speech Analysis and Synthesis by Linear Prediction of the Speech Wave" is one that relates to a wide range of research problems involving the derivation of the autocorrelation function and also is one which illustrates the usual complexity of apparatus therefor. A text published in 1976, entitled "Linear Prediction of Speech" by J. D. Menkel, on volume 12 of a series on "Communications and Cybernetics" gives even more information on prior art arrangements.

It goes without saying that inventors have sought simpler and lower cost circuit arrangements at the outset. The invention here is concerned with one particular class of modulated electronic wave translating circuitry, namely, delta and like modulation. The invention here is directed to circuitry for accurately computing the autocorrelation function from serial binary functions obtained by delta modulation of an input or carrier wave. The circuit component count required with this approach is drastically reduced. The usually complex byte multiplying circuit is replaced by a one bit multiplying circuit, preferably in the simple form of an eXclusive OR (XOR) gating circuit; the byte adding circuit by a simple counter; and the usual complex sample-and-hold circuitry and PCM encoder by a simple delta modulator, whose step size is kept constant throughout a speech frame (about 20 milliseconds).

The closer prior art of which the inventors are aware, is found in the following U.S. patents:

| | | | |
|---|---|---|---|
| 3,196,392 | 7/1965 | Horwitz, et al | 340/146.3Q |
| 3,354,297 | 11/1967 | Anderson, et al | 235/181 |
| 3,736,508 | 5/1973 | Sparrendahl | 325/38B |
| 3,763,433 | 10/1973 | Nicholas | 325/38B |
| 3,793,513 | 2/1974 | Kaneko | 325/152 |

For the most part, the circuit arrangements shown in these patents are only superficially similar to those of the invention. However, comparisons are helpful in an understanding of the invention.

The patent to Horwitz et al., which is the first of a number issued to him and/or his associates over a decade, is directed to optical recognition systems. It illustrates the basic principles in a description of manually generated autocorrelation function factors, but the electronic circuitry (FIG. 38) for carrying out the derivation requires a plurality of shift registers with individual control circuits associated therewith and a plurality of multiplying circuits, each having an associated accumulating circuit. This patent does teach a "second difference" approach to the derivation of the autocorrelation functions factor, which is germane to a "second order" approach of the invention. The principal difference lies in the comparison of a reference correlation factor with a correlation derived involving the taking of a "second difference" in the raw data as against a derived "correlation function of a correlation function" as will be set forth in greater detail hereinafter.

The patent to Anderson, et al. is directed to system analysis by cross-correlation but does have an interrelated autocorrelation function. Basically, there are circuit components in common with the circuitry of the invention in a broad sense. However, the autocorrelation function circuitry does not have a source of signal and time delay circuitry reapplying the signal to multiplying circuitry as in the circuitry according to the invention as will be set forth more specifically hereinafter.

The Sparrendahl patent is directed to delta modulation and delta demodulation of "reversible" nature as is the case of the invention. The counting circuits, the XOR gating circuit and the pulse generating circuit are connected differently and function differently. Though the diagrams seem to be close to those of the invention, there is no autocorrelation function factor in the counting circuits and the XOR gating circuit is just that; no multiplication function is involved.

Similarly, the patent to Nicholas, directed to delta modulation and the broader form known as differential pulse code modulation, is concerned with counter circuits, shift register circuits, accumulator and gate circuits connected differently for a different result in that no autocorrelation factor is in the accumulator circuit and no arithmetic function is performed by the gate circuits. A look up table function is performed by the gate circuits. A look up table circuit and the interconnections can be considered broadly as a reference correlation arrangement but the functioning is unlike that of the circuitry of the invention.

The multiplication and summation of two delta modulation signals with circuit components connected in a different configuration is taught in the patent to Kaneko. The circuitry is basically a coding system involving arithmetic prediction operations in general but there is no resort to any autocorrelation function.

Thus, these prior art arrangements are directed to the processing of delta modulated and like signals without correlation and to autocorrelation of other signals requiring much more complex circuitry because of the complexity in correlating the signals.

According to the invention the objects indirectly mentioned hereinbefore and those that will appear hereinafter as the specification progresses obtain in method and circuitry for generating an autocorrelation function factor of a signal comprising a bivalued digital data bit stream by multiplying the values of successive individual bits of the signal as delayed by a predetermined integral multiple of bits and the value of current successive bits and accumulating the products in a reversible bivalued counting circuit, whereby the accumulated value is a factor of the autocorrelation. A "second order" factor is derived by "repeating" the steps of the process with the resultant "first order" factor.

The method is executed with extremely simple circuitry according to the invention. A conventional $n$-bit serial shift register circuit is suitable as a time delaying circuit. The multiplying circuit is realized in a simple logical exclusive OR (XOR) gating circuit and the accumulating circuit is a bidirectional binary counting circuit arrangement for adding a unit upon the application of an electric signal representative of a binary unit (1) and for subtracting a unit upon the application of an electric level representative of a binary naught (0). A conventional timing wave generating circuit is used for actuating the circuit arrangement, and it normally is such a generating circuit already present in the utilization apparatus.

In order that full advantage obtain in the practice of the invention, preferred embodiments thereof, given by way of example only, are described in detail hereinafter with reference to the accompanying drawing, forming a part of the specification and in which.

Figure 5:
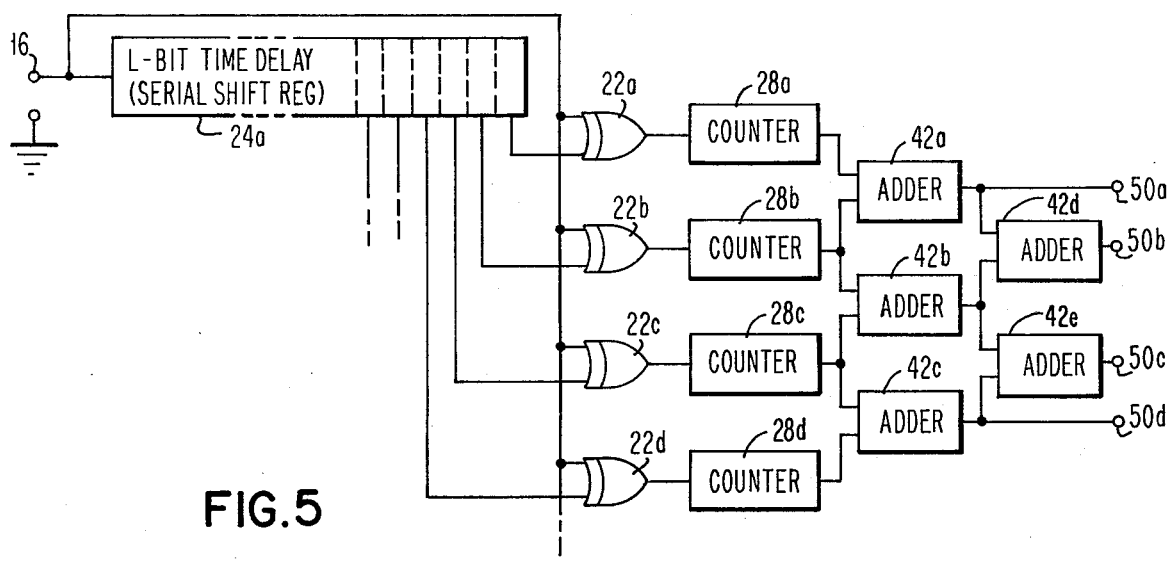
Figure 6:
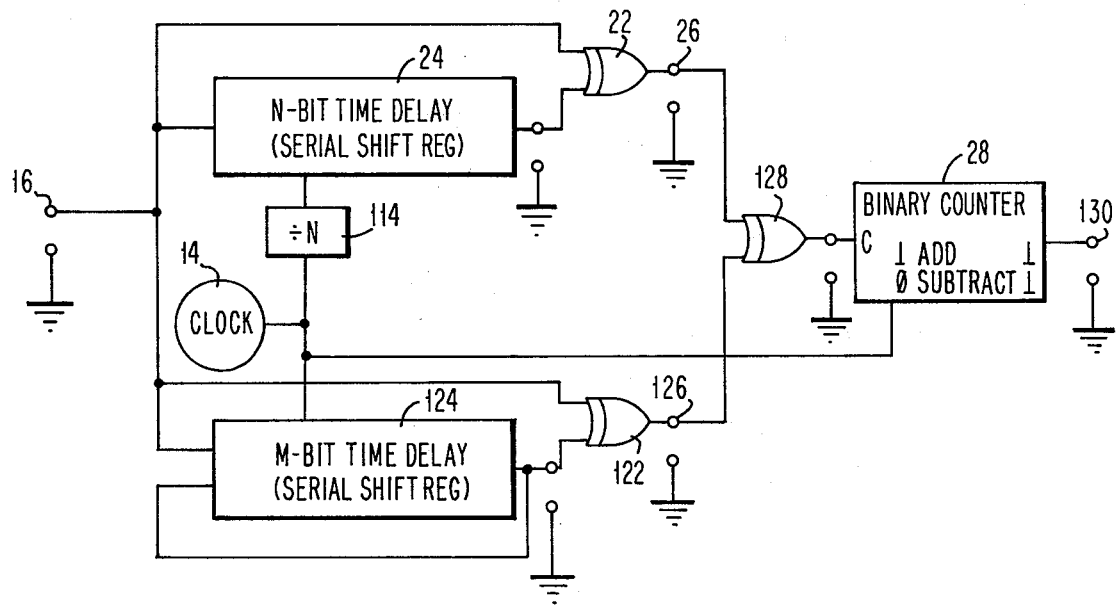
Figure 4:
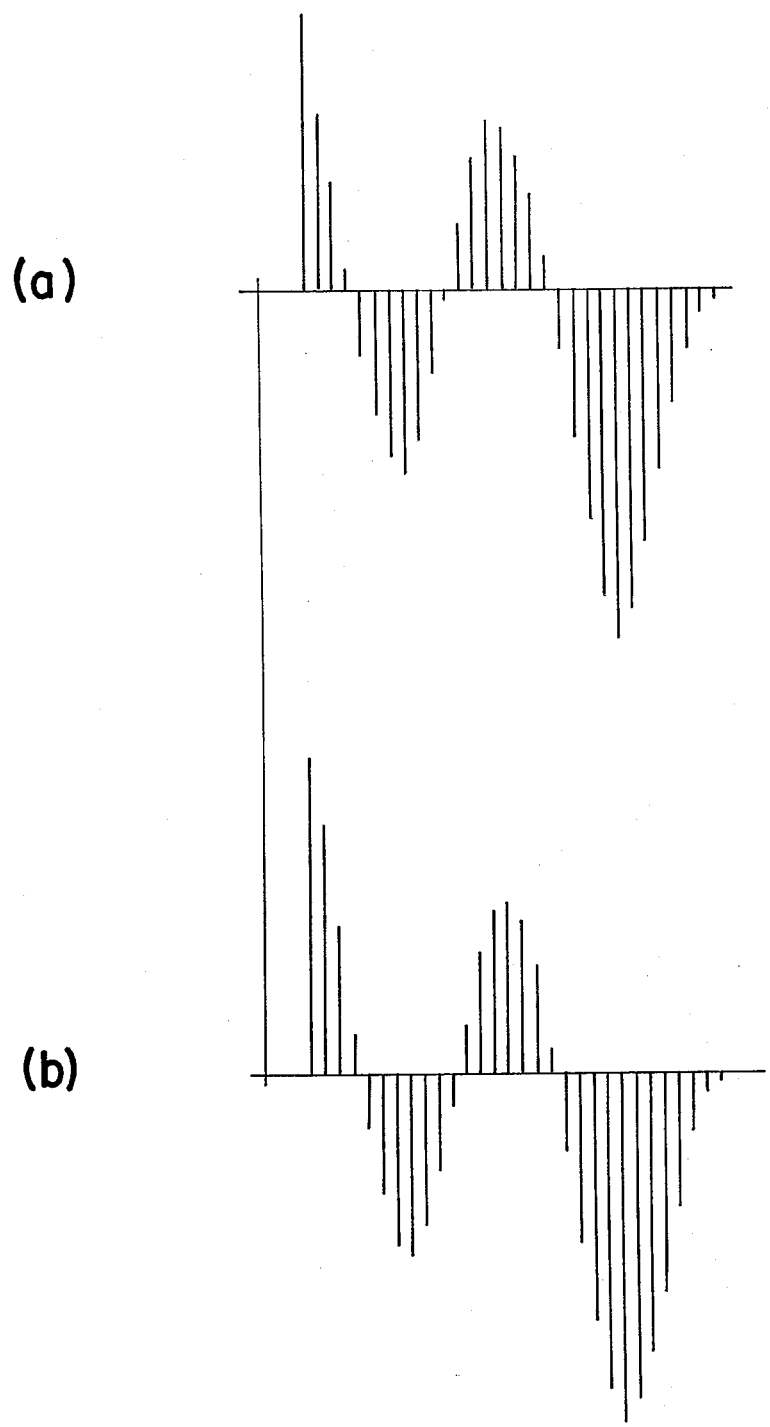

FIG. 4—sections (a) and (b) being taken together—one graphical representations of binary autocorrelation and corresponding analog correlation spectra;

FIG. 5 is a diagram of autocorrelation function factor generating circuitry with smoothing circuitry; and FIG. 6 is a logical diagram of a "second order" autocorrelation function factor generating circuit according to the invention.

Figure 1:
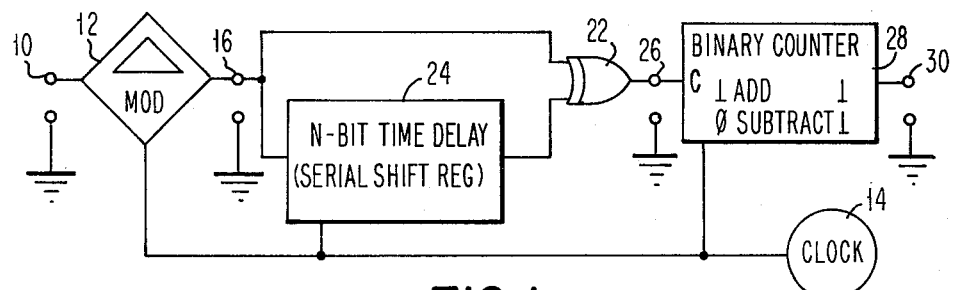
FIG. 1 is a functional diagram of an autocorrelation function factor generating circuit according to the invention.

The simplicity of the autocorrelation function factor generating circuitry according to the invention is apparent upon inspection of the functional diagram of FIG. 1. A modulating wave, for example, a voice frequency wave, is applied at input terminals 10 leading to the input circuit of a modulating circuit 12. An example of modulating circuitry 12 is that shown and described in U.S. Pat. No. 3,911,363 issued Oct. 7, 1975, to Michael Allen Patten for "Delta Modulation Circuitry with Automatic Squelch and Gain Control". A clocking pulse wave is obtained from a conventional clocking pulse wave generating circuit 14 and applied to the modulating circuit 12 for producing an output signal at terminal 16 comprising a bivalued digital data bit stream, more commonly a stream of binary units (1) and/or binary naughts (0).

While the invention will be described hereinafter on the basis of an input wave delta modulated in accordance with the teaching in the U.S. Pat. No. 3,911,363 above-mentioned, it should be clearly understood that other circuitry producing the same or similar output modulated waveforms may be substituted therefor. Those skilled in the art will immediately recognize that delta modulation is a special case of differential pulse code modulation and that some of the other forms of the latter are applicable. That is, as used hereinafter, the term differential pulse code modulation is construed as a more generic term covering systems for transmitting a plurality of binary digits representative of the change in amplitude of an input analog signal for a single sampling period; whereas delta modulation or delta pulse code modulation are synonymous terms referring to the restricted case of differential pulse code modulation wherein only a single binary pulse is transmitted for each sampling interval, and one binary state represents that the sample input waveform has increased relative to the predicted value (that is, the amplitude at the last sampling period) and the other binary state represents that the incoming waveform has decreased relative to the predicted value. For additional background information along this line, reference is made to the prior art U.S. Pat. No. 3,763,433 listed hereinbefore.

The clocking pulse wave normally is obtained from other circuitry utilizing the output from the circuitry according to the invention and there is a wide variety of clocking pulse wave generating circuits useful for the clocking pulse generator 14.

The waveform delivered to the terminal 16, whether from modulating circuit 12 as in a transmitter for example or from the audio frequency demodulator circuit in a receiver for example, are applied in parallel to utilization circuitry (not shown) and to autocorrelation function factor generating circuitry according to the invention. The latter circuitry comprises a logical eXclusive OR gating circuit 22 having two input lines, one of which is directly connected to the modulated wave input terminal 16. An N-bit time delay circuit, which preferably is a binary serial shift register of conventional form, having an input circuit connected to the terminal 16 and an output terminal connected to the other input line of the XOR gating circuit 22, and a shift pulse input terminal connected to the clocking wave generator 14. The output line of the XOR gating circuit 22 is connected to terminals 26. The latter terminal is connected to the count terminal the reversible binary counter 28 having an actuating terminal connected to the timing wave generator 14 and output terminal 30 at which the autocorrelation function factor is presented. The binary counter 28 is arranged to increment by one binary unit in response to a binary unit at the counting input terminal and to decrement by one binary unit in response to a binary naught at the counting input terminal. Such reversible binary counters are conventional in all respects.

This circuit arrangement of FIG. 1 replaces a relatively complex conventional circuit arrangement wherein the input analog signal is applied to sample-and-hold circuitry and the output of the latter is passed to an 8-bit analog-to-digital converter. The output of the converter is applied to a multi-sample time delay circuit serial and to a byte multiplier to which the output of the time delay circuit is also applied. The output of the byter multiplier is then accumulated in a byte accumulator for producing the autocorrelation factor.

The circuit arrangement of FIG. 1 functions one bit at a time. The time delay circuit therefore is a serial shift register or the like. The multiplying circuit 22 functions as follows:

For delta modulating of uniform "step size" increments the modulated wave signal stream comprises single bit increments. For an analog signal of increasing amplitude, the increment is $+i$; and for an analog signal of decreasing amplitude, the increment is $-i$. There are four products involved:

$$i(i) = i^2$$

$$i(-i) = -i^2$$

$$(-i)(-i) = i^2$$

$$(-i)i = -i^2$$

The increments are equal in magnitude, wherein $i=1$, and the products resolve to $+1$ and $-1$. This bivalued product is then produceable with the XOR gating circuit 22, substituting binary unit (1) for $+1$ and binary naught (0) for $-1$.

Figure 2:
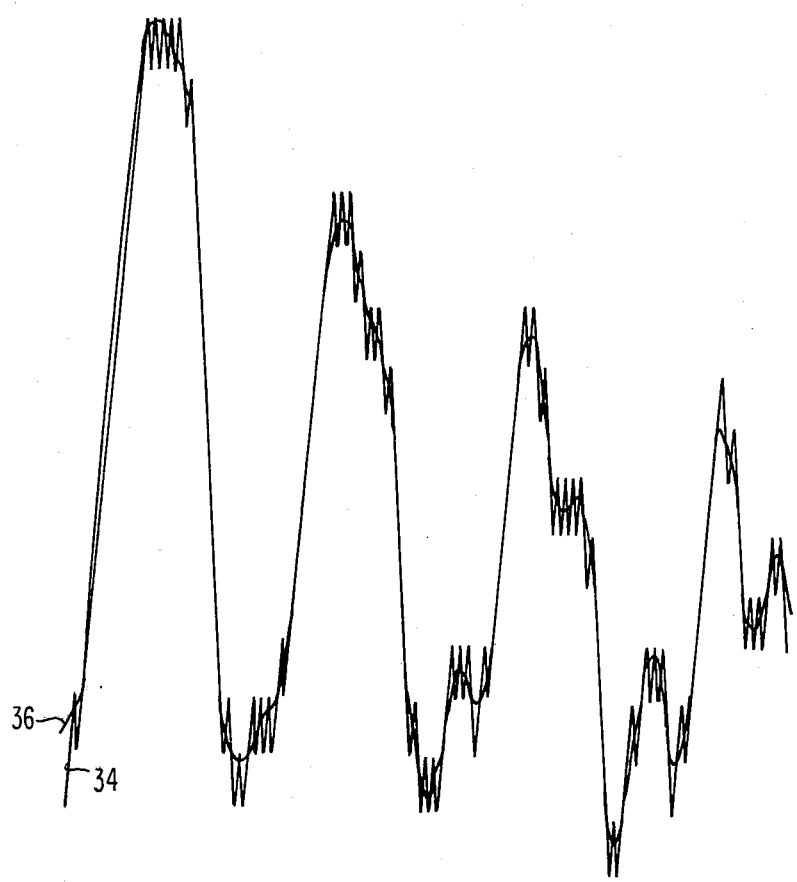
FIG. 2 is a graphical representation of an analog voice signal and a corresponding delta modulation function.
Figure 3:
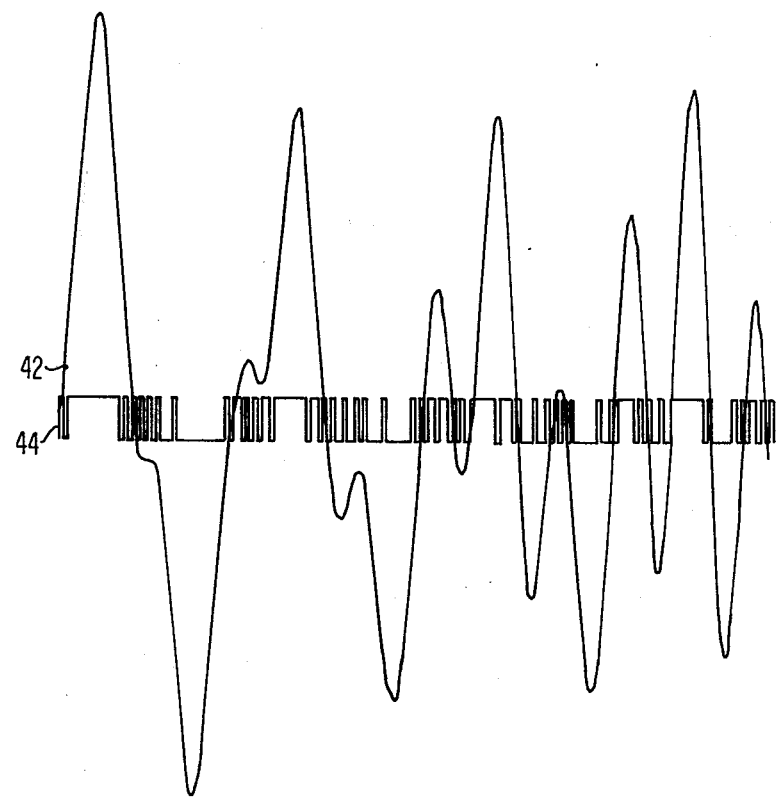
FIG. 3 is a graphical representation of an analog signal and derivative wave derived by delta modulation of that signal.

FIG. 2 is a graphical representation of a frame of 400 samples of an analog voice signal as simulated with a six-pole filter at a sampling rate of 20 KHz. A smooth curve 34 is approximated by a jagged piecewise linear curve 36. The filter resonant points are 420 and 1255 Hz. The derivatives of the curves 34 and 36 are graphically represented in FIG. 3 by curves 42 and 44. Because the slope is represented by only two values, the derivative of the delta modulation approximation is a two valued function. FIG. 4 (a) is a graphical representation of the first 30 autocorrelation functions of the curves of FIG. 2 after four stages of smoothing for a binary autocorrelation spectrum while FIG. 4(b) is a similar representation for the analog autocorrelation spectrum. The validity of the delta modulation approximation is demonstrated by the near identical shapes of the two spectra in FIG. 4. A stage of smoothing is defined by replacing each autocorrelation factor by the sum of itself and its neighbor. A logical arrangement according to the invention is depicted in FIG. 5. Here the components corresponding to those previously described are given lower case letter suffixes, as the functioning is the same. Fine adder circuits $42a$. . . $42e$ are identical binary bit adder circuits of conventional structure and readily available off-the-shelf. Four autocorrelation function factors are delivered at output terminals $50a$. . . $50d$.

A "second order" autocorrelation function gnerating circuit is diagramed in FIG. 6. The circuit arrangement from the delta modulated input wave terminal 16 to the output terminal 26, including the clock pulse wave generating circuit 14 and the binary counter 25 is identical to that described hereinbefore. Another XOR gating circuit 122, an M-bit time delay circuit 124, a pulse rate dividing circuit 114 and a further XOR circuit 128 are connected in much the same manner as the previously described components as shown for delivering a second order factor at output terminals 130. The components of this extended circuitry preferably are identical in structure to the components of the earlier circuitry. One obvious exception is that the M-bit circuit 124 is connected as a circulating shift register, and the dividing circuit 114 is arranged so that the register 124 circulates once for each bit passing through the register 24. The M-bit register may have a different number of stages than the N-bit circuit 24 if desired. Thus, successive bits at terminals 16 are correlated to each successive bit of the previous M-bits of the signal.

$$Y_n = \Sigma (X_i X_{i-n}) Y_{n-m} = \Sigma (X_i X_{i-n+m}) \Sigma Y_n Y_{n-m} =$$
$$\Sigma (\Sigma x_i \ldots X_{i-n}) \cdot [\Sigma(X_i X_{i-n+m})] \qquad (2)$$

In words the output product from the XOR 22 is multiplied in turn by successive output products of the XOR circuit 122 and the successive products of these two circuits as derived from the XOR circuit 128 are accumulated in the counter 28. In more specific, words the invention here comprises an automated method of operating electronic apparatus having electronic components capable of and interconnected for generating an autocorrelation function factor of an analog electric signal by first converting the analog signal into a bivalued digital data bit stream, delaying the data bit stream bit after bit in time by an integral number of bits, and thereafter multiplying bit after bit the values of each bit in the delayed bit stream by the bit simultaneously appearing in the above-mentioned bivalued data bit stream for producing a first bit stream of multiplication bit products. At the same time the process is carried on by delaying the data bit stream bit after bit in time by an integral number not necessarily equal to the first mentioned integral number of bits and recirculating the last mentioned integral number of bits in the same interval of time as for the first mentioned number of bits, and multiplying bit after bit the values of each bit in the recirculated bit stream by the bit simultaneously appearing in the bivalued data bit stream for producing another bit stream of multiplication bit products. The process continues by multiplying the simultaneously appearing bit products of the first mentioned and the other streams of multiplication bit products bit after bit for producing a further bit stream of multiplication bit products, and finally algebraically accumulating bits of the further bit products over a predetermined number of bits for producing a bit product sum constituting the autocorrelation number.

Second order factors are desirable with more complex waves following a more complex repetition pattern. Empirically, observation has shown that such second order factors do render better autocorrelation than had been expected, although the reason therefor has not been determined other than for equation (2) above. Obviously now, the arrangement shown for second order determination can be extended for further orders but the necessity for further order determination appears to be rare; radar, radio telescope and like echo analysis is an example of a function that can use such further order determination.

While the invention has been shown and described with reference to specific embodiments thereof, it should be understood that those skilled in the art will make changes without departing from the spirit and scope of the invention as defined hereinafter in the appended claims concluding the specification.

The invention claimed is:

1. Autocorrelation function factor generating circuitry comprising;
   a source of clocking pulse wave,
   a signal modulating circuit arrangement having a modulating electric wave input terminal at which is applied a signal wave for which an autocorrelation function factor is desired, having a carrier wave input terminal at which a clocking pulse wave from said source is applied and having an output terminal at which is presented an output wave comprising a series of binary naughts and units, a digital multiplying circuit having an input line connected to said output terminal of said modulating circuit, having another input line and having an output line, a multi-bit digital time delay circuit connected between said output terminal of said modulating circuit and said other input line of said multiplying circuit, and a binary counting circuit of the up-down type having a counting input line connected to said output line of said multiplying circuit, and having output terminals at which said autocorrelation factor is delivered.

2. Autocorrelation function factor generating circuitry comprising;

a source of clocking pulse wave, a delta modulating circuit arrangement having a modulating electric wave input terminal at which is applied a signal wave for which an autocorrelation function factor is desired, having a carrier wave input terminal at which a clocking pulse wave from said source is applied and having an output terminal at which is presented an output wave comprising a train of binary naughts and units, an XOR gating circuit having an input line connected to said output terminal of said modulating circuit, having another input line and having an output line, a multi-bit digital time delay circuit connected between said output terminal of said modulating circuit and said other input line of said XOR gating circuit, and a binary counting circuit of the type wherein one binary unit is added in response to each input binary unit and one binary unit is substracted in response to each input binary naught and having a counting input line connected to said output line of said XOR gating circuit, and having output terminals at which said autocorrelation factor is delivered.

3. An automated method of operating electronic apparatus for generating an autocorrelation function factor of an electric signal comprising a given bivalued digital data bit stream, said apparatus having electronic components capable of and interconnected for automatically performing the steps of:

delaying said given data bit stream bit after bit in time by an integral number of bits, multiplying bit after bit the values of each bit in the delayed bit stream by the simultaneously appearing bit in the given bit stream for producing a bit stream of multiplication bit products, delaying said data bit stream bit after bit in time by an integral number not necessarily equal to the first said integral number of bits and recirculating the last said integral number of bits in the same interval of time as for the first said number of bits, multiplying bit after bit the values of each bit in the recirculated bit stream by the simultaneously appearing bit in the incoming bit stream for producing another bit stream of multiplication bit products, multiplying bit after bit the simultaneously appearing bit products of the first said and said other streams of multiplication bit products for producing a further bit stream of multiplication bit products, and accumulating bits of said further bit product stream over a predetermined number of bits for producing a bit product sum constituting the autocorrelation number.

4. An automated method of operating electronic apparatus for generating an autocorrelation function factor of an analog electric signal, said apparatus having electronic components capable of and interconnected for automatically performing the steps of:

converting said analog signal into a bivalued digital data bit stream, delaying said data bit stream bit after bit in time by an integral number of bits, multiplying bit after bit the values of each bit in the delayed bit stream by the simultaneously appearing bit in said bivalued data bit stream for producing a bit stream of multiplication bit products, delaying said data bit stream bit after bit in time by an integral number not necessarily equal to the first integral number of bits and recirculating the last said integral number of bits in the same interval of time as for the first said number of bits, multiplying bit after bit the values of each bit in the recirculated bit stream by the simultaneously appearing bit in said bivalued data bit stream for producing another bit stream of multiplication bit products, multiplying bit after bit the simultaneously appearing bit products of the first said and said other streams of multiplication bit products for producing a further bit stream of multiplication bit products, and algebraically accumulating bits of said further bit products over a predetermined number of bits for producing a bit product sum constituting the autocorrelation number.

5. Autocorrelation function factor generating circuitry comprising a source of digital data signal represented by a stream of bivalued data bits, modulated signal wave input terminals connected to said source, output terminals at which an electric representation of a binary number autocorrelation function factor is delivered, an XOR gating circuit having an input line connected to said input terminals, having another input line and having an output line, a multi-bit digital time delay circuit connected between said input terminals and said other input line of said XOR gating circuit, another XOR gating circuit having an input line connected to said input terminals, having another input line and having an output line, another multi-bit digital time delay circuit connected between said output terminals and said other input line of said other XOR gating circuit, and connected for recirculating operation, a source of timing waves connected to said digital time delay circuits for recirculating the data in said other time delay circuit in synchronism and as fast as the passage of one bit in the first said time delay circuit, a further XOR gating circuit having input lines individually connected to said output lines of the other XOR gating circuit, and a binary counting circuit of the type wherein one binary unit is added in response to each input binary unit and one binary unit is subtracted in response to each input binary naught and having a counting input line connected to said output line of said further XOR gating circuit, and having output terminals connected to said factor delivering output terminals.

6. Autocorrelation function generating circuitry as defined in claim 5 and wherein
said time delay circuits comprise shift registers, and
said source of timing waves comprises a digital dividing circuit connected between said source and one of said shift registers.

* * * * *